May 6, 1941. G. B. WARREN 2,240,594
TRAP
Filed Dec. 5, 1940 2 Sheets-Sheet 1
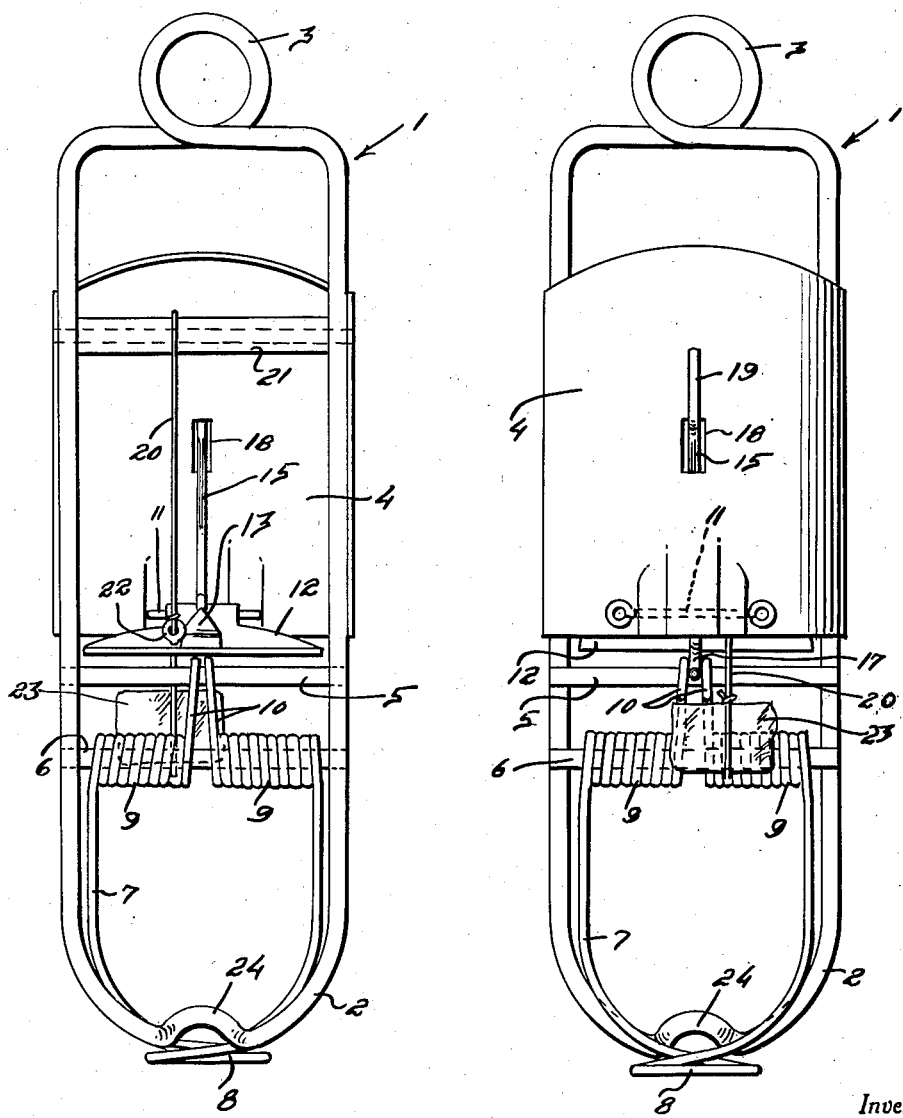
Inventor
George B. Warren
By Clarence A. O'Brien
Attorney May 6, 1941. G. B. WARREN 2,240,594
TRAP
Filed Dec. 5, 1940 2 Sheets-Sheet 2
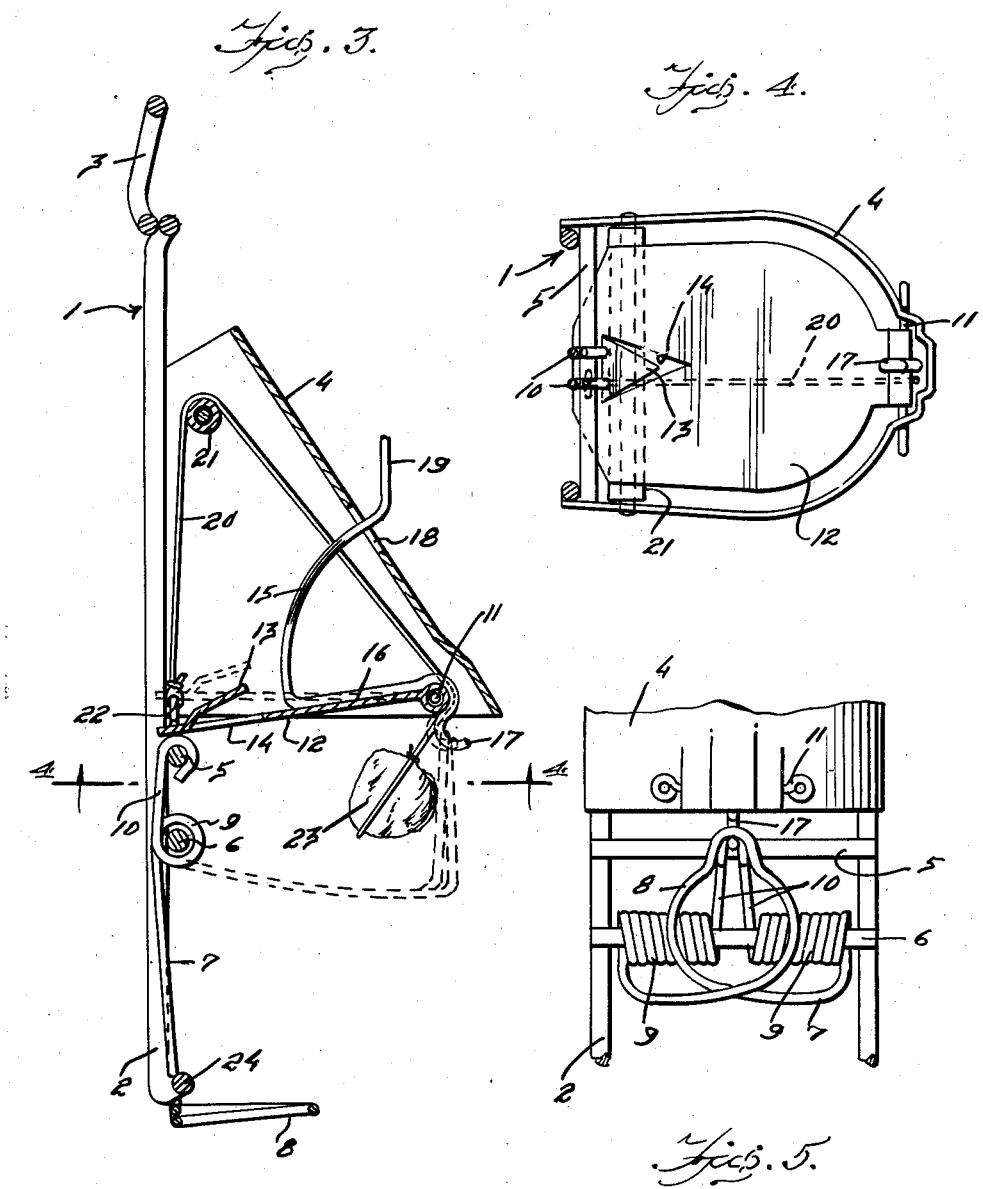
Inventor
George B. Warren
By Clarence A. O'Brien
Attorney Patented May 6, 1941

2,240,594

UNITED STATES PATENT OFFICE 2,240,594

TRAP

George E. Warren, Los Angeles, Calif.

Application December 5, 1940, Serial No. 368,703

5 Claims. (Cl. 43—83.5)

The present invention relates to new and useful improvements in traps particularly for gophers but it will be understood, of course, that the device may be used for catching any other animals for which it may be found adapted and desirable.

An important object of the invention is to provide, in a manner as hereinafter set forth, a trap of the aforementioned character embodying a novel trigger mechanism whereby said trap will be sprung before the animal is aware that anything has occurred.

Another very important object of the invention is to provide a trap of the aforementioned character which is adapted to catch the animal without damaging the fur or skin thereof.

Still another very important object of the invention is to provide a trap of the character described which is adapted to be set in various ways or positions for catching different animals.

Other objects of the invention are to provide an animal trap which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a trap constructed in accordance with the present invention, showing said trap before it is set.

Figure 2 is a bottom plan view thereof.

Figure 3 is a view in vertical section through the trap.

Figure 4 is a sectional view, taken substantially on the line 4—4 of Figure 3.

Figure 5 is a top plan view of an intermediate portion of the trap, showing said trap set.

Referring now to the drawings in detail, it will be seen that the reference numeral 1 designates generally what may be considered a base in the form of a frame of heavy wire. The frame 1, it will be noted, is elongated and comprises a rounded or substantially U-shaped end portion constituting a stationary jaw 2. The other end of the frame 1 is formed to provide a loop or coil 3 for connecting an anchoring or supporting chain to the trap.

Rigidly mounted on an intermediate portion of the frame 1 is an inclined metallic hood or housing 4 of substantially U-shaped cross section. Forwardly of the hood 4 a pair of spaced, parallel stationary rods 5 and 6 traverse the frame 1. Mounted on the rod 6 for coaction with the stationary jaw 2 is a swinging jaw 7 of suitable resilient wire. The swinging jaw 7 is substantially U-shaped and the bight portion thereof is formed to provide an angularly projecting substantially ovate loop 8. On the ends of the legs of the swinging jaw 7 are coils 9 which are mounted on the rod 6. At their inner ends the coils 9 terminate in arms 10 which are secured to the rod 5. Thus, when the jaw 7 is swung away from the stationary jaw 2, the coils 9 are wound or tightened.

Mounted in one end portion of the hood 4 is a shaft 11. Journaled for swinging movement on the shaft 11 is a metallic plate constituting a trigger 12. Struck from the free end portion of the trigger 12 is a prong 13 which leaves an opening 14 in said trigger. The prong 13 provides means for securing suitable bait on the trigger 12 within the hood 4 over the opening 14. The bait is impaled on the prong 13.

The reference numeral 15 designates an arcuate arm comprising an angularly extending portion 16 which is rigidly secured on the trigger 12. At one end, the portion 16 of the arm 15 passes over the pivoted end of the trigger 12 and terminates in a hook 17 which is engageable in the loop 8 for releasably securing the jaw 7 in set position against the tension of the coil springs 9. The arm 15 is operable in a slot 18 which is provided therefor in the hood 4 and terminates, at its other end, in a handle portion 19.

In the use of the invention as thus far described, if bait is to be used, said bait is inserted in the hood 4 through the frame 1 and is impaled on the prong 13. The jaw 7 is then swung to set position against the tension of the coil springs 9, as suggested in dotted lines in Figure 3 of the drawings and secured by engaging the hook 17 in the loop 8. This operation is facilitated by the arm 15 which is used as a handle for swinging the hook 17, also the trigger 12. The handle portion 19 of the arm 15 also serves as an indicator for showing when the trap has been sprung. This is particularly desirable when the trap is used in a burrow. When the trigger 12 is swung toward the hood 4 by the animal the hook 17 is disengaged from the loop 8 thus releasing the jaw 7. The construction and arrangement is such that very slight movement of the trigger 12 will accomplish this. The jaw 7, thus released, swings toward the stationary jaw 2 and smites the animal with sufficient force usually to kill or at least stun said animal. Of course, the trapped animal is held between the jaws 7 and 2. It will thus be seen that any pressure exerted against the trigger 12 by an animal will spring or release the trap. The loop 8 facilitates opening the jaw 7 without the necessity of touching the animal.

Another means for baiting the trap comprises a cord or flexible element 20 which is trained over a roller 21 journalled in the small end portion of the hood 4. One end of the cord 20 is secured, as at 22, to the free end portion of the trigger 12. The other end portion of the cord 20 passes over the pivoted end of the trigger 12 on the shaft 11 and bait is tied thereto, as at 23.

When the bait 23 is taken by the animal the trigger 12 is actuated by the cord 29 in a direction to swing the hook 17 which, it will be recalled, is fixed on said trigger, out of engagement with the loop 8 thereby freeing the spring actuated jaw 7. The bight portion of the stationary jaw 2 is formed to provide a hump 24 which is engageable in the jaw 7.

The device may be placed flat on the ground or other surface, hung in a tree or inserted in a burrow. When used in the last mentioned manner the trigger mechanism is protected by the hood 4. When suspended in a tree the hood 4 functions as a shield for protecting the trapped animal from rain and snow.

It is believed that the many advantages of a trap constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A trap of the character described comprising an elongated wire frame including a substantially U-shaped end portion constituting a stationary jaw, a hood, open at one end, mounted on said frame, a spring actuated jaw pivotally mounted on the frame and cooperable with the first named jaw, a trigger pivotally mounted in the open end portion of the hood, and a hook on the pivoted end of said trigger engageable with the pivoted jaw for releasably securing same in set position, the trigger being operable by an animal.

2. A trap comprising an elongated wire frame, a hood mounted on said frame, a substantially U-shaped, spring actuated jaw mounted on the frame and adapted to smite an animal, a loop on the bight portion of said jaw, an animal operated trigger mounted for swinging movement in the hood, an arm including an angularly extending portion secured to the trigger, a hook on said angularly extending portion of the arm engageable in the loop for releasably securing the jaw in set position, said arm being operable in an opening in the hood for engaging the hook in the loop, and means for mounting bait on the trigger.

3. A trap of the character described comprising an elongated wire frame including a substantially U-shaped end portion constituting a stationary jaw, a loop on the other end of the frame for connecting an anchoring element to said frame, an inclined hood, open at its ends, mounted on the frame at an intermediate point, a pair of spaced, parallel bars traversing the frame adjacent the forward end of the hood, a substantially U-shaped jaw including coil springs on its ends encircling one of the rods for pivotally mounting the second named jaw thereon, arms on one end of the coils secured to the other rod, the second named jaw including an integral loop on its bight portion, a trigger pivotally mounted in the large end portion of the inclined hood and operable by an animal, and a hook on the pivoted end of said trigger engageable in the second named loop for releasably securing the second named jaw in set position.

4. A trap of the character described comprising a wire frame, a hood of substantially U-shaped cross section mounted on said frame, a spring actuated jaw pivotally mounted on the frame, a trigger mounted for swinging movement in the hood, a hook on said trigger engageable with the jaw for releasably securing said jaw in set position, a member in the hood, a flexible element trained around said member and connected to the trigger at one end, the other end of said member extending adjacent the approach side of the trigger for holding bait adjacent thereto, said flexible member constituting means, when the bait is taken, for actuating the trigger for disengaging the hook from the jaw, and means connected to the trigger for manually actuating same for engaging the hook with the jaw after said jaw has been swung to set position.

5. A trap comprising an elongated frame including an endless wire, one end portion of said frame being substantially U-shaped and constituting a stationary jaw including a hump on its bight portion, an integral coil on the other end of the frame, a spring actuated jaw mounted for swinging movement on the frame and cooperable with the stationary jaw and with the hump thereon, an integral loop on the second named jaw extending at right angles therefrom, and an animal operated trigger pivotally mounted on the frame and engageable with the loop for releasably securing the second named jaw in set position.

GEORGE B. WARREN.